United States Patent
Miller et al.

[15] 3,675,625
[45] July 11, 1972

[54] ANIMAL LITTER

[72] Inventors: Timothy A. Miller, Ferguson; Larry R. Hanselman, Affton, both of Mo.

[73] Assignee: Ralston Purina Company, St. Louis, Mo.

[22] Filed: July 9, 1970

[21] Appl. No.: 53,642

[52] U.S. Cl. ............................................................. 119/1
[51] Int. Cl. ........................................................A01k 29/00
[58] Field of Search ...................................................119/1

[56] References Cited

UNITED STATES PATENTS

| | | |
|---|---|---|
| 1,967,333 | 7/1934 | Smith..........................................119/1 |
| 2,351,686 | 6/1944 | Kohl............................................119/1 |
| 2,014,900 | 9/1935 | Lapp............................................119/1 |
| 2,279,405 | 4/1942 | Laughlin.....................................119/1 |
| 2,376,672 | 5/1945 | Dreyling.....................................119/1 |
| 1,981,877 | 11/1934 | Pierce......................................119/1 X |
| 2,179,591 | 11/1939 | Godchaux.................................119/1 |
| 2,470,346 | 5/1949 | Frankenhoff..............................119/1 |

*Primary Examiner*—Aldrich F. Medbery
*Attorney*—Robert W. Brukardt and Virgil B. Hill

[57] ABSTRACT

An improved animal litter has been developed which selectively adsorbs an odor control agent so that the fragrant pleasing aroma of said agent is no longer obvious or apparent or lost during extended periods of time, but is capable of being selectively deadsorbed by the presence of moisture, as in urine or fecal material and released to mask any offensive odors.

9 Claims, No Drawings

ANIMAL LITTER

BACKGROUND OF THE INVENTION

This invention relates to an improved animal litter and a process for producing the same.

Various types of materials have been proposed for use as animal litters, primarily because of their high absorbancy or affinity for moisture since it is essential that litter materials have a high affinity for moisture because of the desirability of needing to change the litter only periodically as opposed to more frequent changes. Various types of absorbants, however, even though possessing a high affinity for moisture do not have an inherent ability to effectively and quickly overcome or neutralize the strong odors produced by urine and the fecal material of animals using this litter. For this reason, it has been proposed to incorporate with the absorbant material a certain percentage of various chemicals and natural materials which may be alternately acidic to neutralize the ammoniacal odors from urine or on the other hand to have a deodorizing capacity in the sense of neutralizing these odors by absorbing them. Such natural materials may be typically plant materials containing a high percentage of chlorophylls such as alfalfa, etc. A disadvantage of using these plant materials, however, is that they are very light and porous and accordingly either blow out of the box or are tracked out of the box by the animal. They furthermore have a tendency to reach their odor absorption capacity very rapidly, this capacity being even further diminished by the use of the litter in conditions of high humidity or temperature. Various chemicals which have been incorporated in or added to the absorbant and designed to react with these offensive odors to render them odorless, likewise react and are dissipated quickly besides also not being able to continually overcome the offensive odors produced when the litter is kept in use for a continued period of time. Also, the chemical reaction between the offensive odor and such an agent typically will go to completion, thus, eventually, the supply of the agent needed to react with these odors and neutralize them will be gradually diminished or even dissipated and present in an insufficient amount to neutralize the continuing production of odors. Also, the addition of fragrant chemicals to mask these odors has not been necessarily effective since the chemicals have been rapidly lost by volatilization when the litter is in continuous use for say a week or more or even during storage of the litter.

By the present invention, an improved cat litter has been developed which contains a pleasing odor and which is designed to overcome the deficiencies of the prior art litters in that the pleasing odor is displaced slowly and continually by the presence of moisture in urine or fecal material of the animal while being effectively retained in the absorbant material without loss of volatilization over an extended period of time.

SUMMARY OF THE INVENTION

The improved animal litter of the present invention utilizes a principle of selective adsorption of liquids by activated-absorbants to provide a reliable and effective means of masking offensive odors produced by the urine and fecal material of animals. An absorbant is employed and activated at an elevated temperature until it attains sufficient adsorption capacity to adsorb an odor control chemical agent, which itself is a pleasing and fragrant, odiferous material. Furthermore, the activated absorbant has the ability to adsorb this pleasing, odiferous material to such an extent that the fragrant odor it possesses is no longer obvious or apparent. This is very advantageous in that the fragrant material is rendered free from volatilization when the litter is stored in unused condition for an extended period of time. It was first supposed during development of a litter containing an odor control agent that because of this ability of the fragrant material to be tightly adsorbed on the activated absorbant that an additional amount of the odor control agent would have to be added in order to give the litter a pleasing odor and mask offensive odors during use, since our initial work was primarily directed towards merely adding an odor control agent to an absorbant to be able to overcome or mask odors during use. Surprisingly, however, upon discovering the ability of the activated litter to substantially adsorb the fragrant material and leave the litter essentially odorless, it was also found that upon the addition of moisture, the fragrant odiferous material was again fully apparent and thus fully released from the activated absorbant, and accordingly present in a sufficient amount to overcome any odors. This litter, therefore, was found to be highly desirable in that it not only retained this fragrant odor when it was dry after activation without loss for an extended period of time, but that it also fully and completely released this fragrant material when moisture was added, thus having an ability to release a masking odor when used by the animal because of the presence of moisture in the urine or fecal material and to allow time for the absorbant to neutralize or absorb the urine or fecal material and odors produced thereby.

It is an object of the present invention therefore to provide a preparation for animal litter which embodies an absorbant material with a fragrant odiferous material adsorbed thereon and with the ability to be selectively deadsorbed, i.e., volatilized to release its odor. moisture in the urine or fecal material of animals and mask the offensive odors of these materials until the absorbant effectively absorbs them.

It is another object of the present invention to produce a litter which is reliably and economically manufactured employing commercially and readily available materials in such a manner that the litter produced thereby effectively overcomes offensive odors of urine or feces by masking these odors because of the presence of moisture in the urine or feces.

It is another object to produce a litter which has an effective surface area for absorption in addition to having an odor control agent adsorbed thereon, with the ability to be selectively deadsorbed because of the presence of moisture.

DESCRIPTION OF THE PREFERRED EMBODIMENTS

Although it is not completely understood how the activated absorbant is able to effectively adsorb the fragrant odor control agent and retain it without loss and then completely release it upon the addition of water or moisture, it may be theorized that the activated absorbant effectively adsorbs the molecules of the odor control agents which generally if they are aromatic oils, are quite polar in nature and are thus tightly bound within the surfacial interstices of the activated absorbant and are bound to such an extent that there is no apparent odor indicating their presence. Furthermore, when water is added, as for example, the moisture present in urine or feces, the moisture or water being even more polar in character causes the aromatic, pleasing odor of the chemical agent to be deadsorbed by a reduction in activity or deadsorption of the activated absorbant and to be fully and completely released and effectively mask any offensive odors until the absorbant has had time to effectively deodorize or absorb the odors.

The absorbant which may be employed in the present invention may generally be any type of inorganic absorbant or earth type material such as a clay, vermiculite, silica materials, firebrick or earthen materials such as diatomaceous earth or fullers earth, with the latter two being preferred because of their ready availability and high density which prevents their being tracked out of the litter box by the animal. Generally, the absorbant must be capable of being substantially activated at an elevated temperature to produce a sufficient number of active sites or surfacial interstices on the absorbant to allow the aromatic chemical odor control agent to be fully and completely adsorbed thereon. It may be theorized that the active sites are produced by selective dehydration of the absorbant. The particle size of the absorbant is also an influencing factor in the ability of the absorbant to adsorb since the degree of surfacial area which is present can be correlated with capacity of the absorbant; accordingly, in production of an animal litter, the particle size must also be controlled and is therefore designed to achieve a balance between a high absorptive capacity of the absorbant because of a larger surface area by the use of smaller particles and on the other hand the use of larger particles which, while not having as great a surface area, and are not as absorptive, are also not capable of being readily tracked from the litter box by the animal. Thus, the correct particle size to achieve this balance of surface area for a high absorption capacity and ability to not be easily removed from the box by the animal is generally of a size such that 100 percent of the material will pass through a Tyler No. 61 screen with a 0.132 inch opening although 100 percent of this material will be effectively retained on a Tyler No. 351 screen with a 0.0165 inch opening. This preferred particle size distribution renders a good balance between surface area which is needed while still having a large enough particle to prevent being easily tracked out of the box.

Accordingly, the absorbant of the preferred particle size is placed in an oven, kiln or furnace and activated at a temperature which may range between 250°– 600° F. until a maximum moisture content of not more than 12 percent and preferably 5 percent is attained. Alternately, the clay may be sized and the preferred particle size removed after activation, if desired. This temperature range for a period of time to attain below about 12 percent moisture will effectively render a sufficient number of active sites on the surface of the absorbant available for ready adsorption of the odor control agent until the absorbant containing the agent has no apparent odor or smell.

After the absorbant has been activated at the elevated temperature and cooled, the odor control agent may be effectively adsorbed thereon. The odor control agent may be added to the absorbant by spraying, pouring, and may be either in pure or diluted form, such as being dissolved in a volatile organic solvent. It may easily and preferably be sprayed on or mixed with the activated absorbant and allowed to dry until the odor it possesses is no longer readily ascertainable. Alternately, it may be added in dilute form, dissolved in a volatile organic solvent and sprayed thereon and the solvent allowed to dissipate leaving the residuancy odor control agent adsorbed on the activated absorbant.

Various types of odor control agents are highly suitable for use in the present invention and various aromatic oils, such as pine oil, citrus oils such as lemon, line or orange oil, oil of cloves, cinnamon oil or various combinations thereof may be employed, since they are highly aromatic in character consisting essentially of highly polar odiferous compounds capable of being readily and completely adsorbed by the activated absorbant. Furthermore, various crystalline materials having an aromatic odor such as menthol, camphor, or various types of phenolic materials may also be used by dissolution in an organic solvent and added to the absorbant and the solvent allowed to dissipate so that the residuary material is effectively and completely adsorbed. Most of these compounds or mixtures contain highly polar molecules which are able to be so tightly bound or absorbed by the activated absorbant that their characteristic odor is no longer readily apparent.

Generally, they may be added in an amount of 0.1 – 1 percent by weight of the absorbant, although the amount will be varied within this range, depending on the particular odor control agents employed and strength of the odor desired.

After the agent is added, it is allowed to dry until there is no longer a substantial smell apparent of the odor control agent employed. At this stage, the agent is tightly adsorbed on the active sites or interstices of the activated absorbant, with the ability to remain so adsorbed even for extended periods of time without volatilization or loss by exposure to the air. The odor control agent, however, is still readily able to be deadsorbed by the addition of moisture in the form of urine or being present in the feces because of the more polar nature of the water and its ability to fully and completely release the adsorbed odor control agent by selective deadsorption or replacement of it from the active sites of the absorbants, since more polar materials will generally replace less polar materials on an absorbant.

The full release of the fragrant, aromatic odor control agent thus effectively masks the objectionable odors produced by the urine or feces until the absorbant has been able to sufficiently neutralize or deodorize these materials.

The following examples will be illustrative of my invention:

EXAMPLE 1:

Approximately 400 lbs. of diatomaceous earth was activated at a temperature of about 270° F. until a moisture content of about 5 percent in the earth was obtained. The activated diatomaceous earth was then sized by passing alternately through a No. 6 Tyler screen and a No. 35 Tyler screen in order to remove most of the fine particles and attain the preferred particle size distribution.

Forty-eight lbs. of the activated earth was then placed in a 55 gallon coating drum. About 2 additional pounds of the activated earth was taken and separately mixed with 56.8 grams of an odor control agent mixture which itself comprised a concentrated mixture of oil of cloves, oil of pine, cinnamon oil and camphor. The 2 lbs. of activated earth containing the odor control agent was then added to the 48 lbs. in the coating drum and thoroughly mixed throughout the 48 lbs. of activated earth. The activated earth with the odor control agent adsorbed thereon had no apparent odor, although the characteristic and fragrant aroma of the odor control composition was again apparent when the water was added to the activated earth.

EXAMPLE 2:

The animal litter with the odor control agent adsorbed thereon as produced in Example 1 was subdivided into 1 pound lots and the 1 pound lots divided into 3 separate groups with the first group being stored at a temperature of 140° F. for a period of 2 weeks, the second group being stored at 90° F. and 70 percent relative humidity for 2 weeks and the third group being stored at room temperature for 2 weeks. At the end of this 2 week period, all of the lots of animal litter readily produced the fragrant pleasing aroma of the odor control composition when water was added thereto. All of the aforementioned groups were stored for an additional week at the aforementioned temperatures and at the end of this time, none of the products displayed the characteristic odor of the odor control mixture, although the product which was stored at 90° F. and 70 percent relative humidity displayed a faint aroma. However, at the end of this 3 week period, the aroma odor control agent could readily be released by the addition of water.

At the end of 5 weeks, a test of each of the above batches of animal litter was made by adding 10 ml. of cat urine to a quantity of the litter spread out in a box. Even after this period of time, the pleasing fragrant aroma of the odor control agent was readily apparent when the urine was added and no offensive odors were apparent or produced by the added urine.

It is my intention to cover the appended claims all equivalents or modifications as may reasonably be included within their scope.

We claim:

1. An animal litter which produces a fragrant odor when contacted with an aqueous liquid consisting, essentially, of a heat treated high density absorbant having moisture content not greater than 12 percent and a highly polar fragrant odor control agent; said litter having, essentially, no readily discernible odor until contacted with an aqueous liquid.

2. An improved animal litter capable of masking offensive odors during use as set forth in claim 1 where said absorbant is diatomaceous earth.

3. An improved animal litter as set forth in claim 1 wherein said absorbant has a particle size which is capable of passing through a No. 6 Tyler screen, but being substantially retained on a No. 35 Tyler screen.

4. An improved animal litter as set forth in claim 1 wherein said odor control agent of a pleasing odor is added in an amount between about 0.1 – 1 percent by weight of said litter.

5. Process for producing an improved animal litter comprising activating a high density litter absorbant at an elevated temperature allowing the absorbant to cool adsorbing a highly polar odor control agent in the litter which is volatilized from the absorbant by the presence of an aqueous liquid.

6. A process for producing an improved animal litter as set forth in claim 5 where said absorbant is diatomaceous earth.

7. A process for producing an improved animal litter as set forth in claim 5 where said particle size selected is capable of passing a No. 6 Tyler screen, but being substantially retained on a No. 35 Tyler screen.

8. A process for producing an improved animal litter as set forth in claim 5 wherein said odor control agent is added in an amount between about 0.1 - 1 percent by weight of said absorbant.

9. A process for producing an improved animal litter as set forth in claim 5 where said elevated temperature is between about 250° – 600° F.

* * * * *

UNITED STATES PATENT OFFICE
CERTIFICATE OF CORRECTION

Patent No. 3,675,625          Dated July 11, 1972

Inventor(s) Timothy A. Miller & Larry R. Hanselman

It is certified that error appears in the above-identified patent and that said Letters Patent are hereby corrected as shown below:

Column 2 line 24 insert by after odor. This line should read -- ized to release its odor by moisture in the urine or fecal material --. Column 3 line 12 change "61" to #6 Column 3 line 13 change 351 to #35. In Column 4 line 67, Claim 2 change "where" to wherein and Column 5, Claim 7 line 9 change "where" to wherein.

Signed and sealed this 19th day of December 1972.

(SEAL)
Attest:

EDWARD M.FLETCHER,JR.
Attesting Officer

ROBERT GOTTSCHALK
Commissioner of Patents